US009936427B2

(12) United States Patent
Sivanesan et al.

(10) Patent No.: US 9,936,427 B2
(45) Date of Patent: Apr. 3, 2018

(54) SYSTEMS AND METHODS FOR JOINT HANDOVER OF USER EQUIPMENT AND SECONDARY CELL GROUP IN 3GPP LTE DUAL CONNECTIVITY (71) Applicant: INTEL CORPORATION, Santa Clara, CA (US)

(72) Inventors: Kathiravetpillai Sivanesan, Richardson, TX (US); Ali T. Koc, Portland, OR (US); Satish C. Jha, Hillsboro, OR (US); Rath Vannithamby, Portland, OR (US); Mohammad Mamunur Rashid, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 273 days.

(21) Appl. No.: 14/581,689

(22) Filed: Dec. 23, 2014

(65) Prior Publication Data
US 2015/0264621 A1 Sep. 17, 2015

Related U.S. Application Data (60) Provisional application No. 61/953,614, filed on Mar. 14, 2014.

(51) Int. Cl.
H04W 36/32 (2009.01)
H04W 36/00 (2009.01)
(52) U.S. Cl.
CPC .............................. H04W 36/0055 (2013.01)

(58) Field of Classification Search
CPC .......... H04W 76/025; H04W 36/0055; H04W 36/08; H04W 36/0027; H04W 36/04; H04W 76/028; H04W 36/0072; H04W 36/0083; H04W 36/28; H04W 36/00; H04W 36/0016; H04W 36/0061; H04W 36/0077; H04W 36/06
See application file for complete search history.

(56) References Cited

U.S. PATENT DOCUMENTS 9,756,678 B2 * 9/2017 Yamada ............... H04W 76/046
2011/0200014 A1 8/2011 Lee et al.
2013/0023302 A1 1/2013 Sivanesan et al.
2013/0260763 A1 10/2013 Bhattad et al.
(Continued)

FOREIGN PATENT DOCUMENTS

WO 2013131553 A1 9/2013

OTHER PUBLICATIONS

3GPP TS 36.331, "Evolved Universal Terrestrial Radio Access (E-UTRA); Radio Resource Control (RRC); Protocol Specification," 3rd Generation Partnership Project, Technical Specification Group Radio Access Network, Version 12.0.0, Dec. 2013, pp. 1, 17-18, 50-54, and 142-145.
(Continued)

Primary Examiner — Liton Miah
(74) Attorney, Agent, or Firm — Stoel Rives LLP (57) ABSTRACT Systems and methods provide a joint handover process wherein a user equipment (UE) and at least one secondary node remain connected to each other and are handed over together from a first master node to a second master node. Thus, a re-establishment procedure with the at least one secondary node is avoided.

6 Claims, 4 Drawing Sheets (56) References Cited

U.S. PATENT DOCUMENTS

| | | | | |
|---|---|---|---|---|
| 2014/0192740 | A1* | 7/2014 | Ekpenyong | H04L 5/0035 370/329 |
| 2014/0335872 | A1* | 11/2014 | Yamada | H04W 24/04 455/450 |
| 2015/0124708 | A1* | 5/2015 | Blankenship | H04W 36/08 370/329 |
| 2015/0351119 | A1* | 12/2015 | Song | H04W 72/1268 370/329 |

OTHER PUBLICATIONS

3GPP TR 36.842, "Study on Small Cell Enhancements for E-UTRA and E-UTRAN; Higher Layer Aspects," 3rd Generation Partnership Project, Technical Specification Group Radio Access Network, Version 12.0.0, Dec. 2013, 71 pages.

3GPP TS 36.423, "Evolved Universal Terrestrial Radio Access Network (E-UTRAN); X2 Application Protocol (X2AP)," 3rd Generation Partnership Project, Technical Specification Group Radio Access Network, Version 12.0.0, Dec. 2013, pp. 1, 9-10, and 62.

PCT/US2015/015273, International Search Report and Written Opinion, dated May 21, 2015, 13 pages.

Broadcom Corporation, "MCG handover for Dual Connectivity", R2-140531, 3GPP TSG-RAN WG2 Meeting #85, Prague, Czech Republic, Agenda Item 7.2.1, Feb. 10-14, 2014, 8 pages.

CMCC, "Handling of MeNB HO and SeNB change for dual connectivity operation", R2-140135, 3GPP TSG-RAN WG2 Meeting #85, Prague, Czech Republic, Agenda Item 7.2.1, Feb. 10-14, 2014, 7 pages.

Ericsson, "Dual connectivity—mobility scenarios", R3-140346, 3GPP TSG-RAN WG3 Meeting #83, Prague, Czech Republic, Agenda Item 20.1, Feb. 10-14, 2014, 7 pages.

ZTE Corporation, "Analysis on the Solutions for the Prioritized Scenarios of MeNB Handover", R3-140053, 3GPP TSG-RAN3 Meeting #83, Prague, Czech Republic, Agenda Item 20.3, Feb. 10-14, 2014, 5 pages.

Ericsson, ST-Ericsson, "Way forward with control plane architecture selection", R2-132700, 3GPP TSG-RAN WG2 #83, Barcelona, Spain, Agenda Item 7.2.3, Aug. 19-23, 2013, 6 pages.

ZTE Corporation, "Signalling flows of solution 1A", R3-132204, 3GPP TSG-RAN3 Meeting #82, San Francisco, CA, USA, Agenda Item 20.2.1, Nov. 11-15, 2013, 8 pages.

* cited by examiner

FIG. 4

SYSTEMS AND METHODS FOR JOINT HANDOVER OF USER EQUIPMENT AND SECONDARY CELL GROUP IN 3GPP LTE DUAL CONNECTIVITY

RELATED APPLICATIONS

This application claims the benefit under 35 U.S.C. § 119(e) of U.S. Provisional Application No. 61/953,614, filed Mar. 14, 2014, which is hereby incorporated by reference herein in its entirety.

TECHNICAL FIELD

This disclosure relates to wireless communication networks. Specifically, this disclosure relates to systems and methods for providing handover for user equipment (UE) operating in dual connectivity in a wireless communications system.

DETAILED DESCRIPTION OF PREFERRED EMBODIMENTS

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Systems and methods disclosed herein reduce signaling overhead during handover in a heterogeneous network. In third generation partnership project (3GPP) long term evolution (LTE) systems, dual connectivity allows a UE (e.g., a wireless device such as a cellular phone) to consume radio resources provided by at least two different network nodes (e.g., a master node and a secondary node) connected to each other with non-ideal backhaul (e.g., an X2 interface). As discussed in detail below, when a moving UE is handed over from one master node's coverage area to another master node's coverage area, previous systems disconnected the UE from each of the nodes involved in dual connectivity. Certain embodiments disclosed herein provide a joint handover process wherein the UE and at least one secondary node remain connected to each other and are handed over together from a first master node to a second master node. Thus, a re-establishment procedure with the at least one secondary node is avoided.

In a 3GPP radio access network (RAN) LTE system, a node may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with a wireless device, known as a user equipment (UE). The downlink (DL) transmission may be a communication from the node (e.g., eNB) to the wireless device (e.g., UE), and the uplink (UL) transmission may be a communication from the wireless device to the node.

In homogeneous networks, the node, also called a macro node, may provide basic wireless coverage to wireless devices in a cell. The cell may be the area in which the wireless devices are operable to communicate with the macro node. Heterogeneous networks may be used to handle increased traffic loads on the macro nodes due to increased usage and functionality of wireless devices. Heterogeneous networks may include a layer of planned high power macro nodes (macro-eNBs or macro cells) overlaid with layers of lower power nodes (small cells, small-eNBs, micro-eNBs, pico-eNBs, femto-eNBs, or home eNBs [HeNBs]) that may be deployed in a less well planned or even entirely uncoordinated manner within the coverage area (cell) of a macro node. The lower power nodes (LPNs) may generally be referred to as "low power nodes," small nodes, or small cells.

The macro node may be used for basic coverage. The low power nodes may be used to fill coverage holes within a macro node's geographic coverage area (i.e., cell) and at the boundaries between the macro nodes' coverage areas. Low power nodes may also be used to improve capacity in high use areas and improve indoor coverage where building structures impede signal transmission.

As used herein, the terms "node" and "cell" are both intended to be synonymous and refer to a wireless transmission point operable to communicate with multiple user equipment, such as an eNB, a low power node, or other base station.

Figure 1:
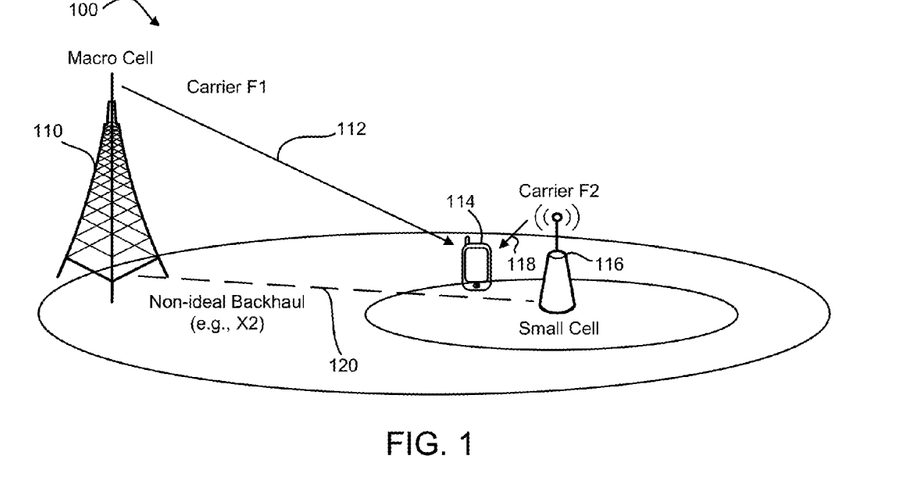
FIG. 1 is a block diagram of a communication network operating in dual connectivity according to one embodiment.

Dual connectivity refers to an operation where a given UE consumes radio resources provided by at least two different nodes connected with non-ideal backhaul. For example, FIG. 1 is a block diagram of a communication network 100 operating in dual connectivity according to one embodiment. The network 100 includes a macro cell 110 configured to communicate user data 112 to a UE 114 using a first carrier frequency F1, and a small cell 116 configured to communicate user data 118 to the UE 114 using a second carrier frequency F2. The macro cell 110 and the small cell 116 communicate with one another through a non-ideal backhaul interface 120 (e.g., an X2 interface). The dual connectivity shown in FIG. 1 provides inter-node radio resource aggregation (or inter-site carrier aggregation) to improve per-user throughput. Dual connectivity allows mobility management to be maintained on the macro layer while aggregating small cells to provide extra user plane capacity to increase throughput. Radio bearers carrying the user data 112, 118 can either use resources of the macro cell 110 only, of the small cell 116 only, or can aggregate both, depending on whether increased coverage, offload, or throughput is desired. Keeping the mobility anchor in the macro cell 110 may help reduce signaling overhead toward the core network.

The nodes (e.g., the macro cell 110 and the small cell 116) involved in dual connectivity for the UE 114 may assume different roles, which do not necessarily depend on the node's power class. For example, one node may act as a master node and one or more additional nodes may act as secondary or slave nodes. Generally, although not always, the macro cell 110 may perform the functions of a master eNB (MeNB) and the small cell 116 may perform the functions of a secondary eNB (SeNB). The MeNB terminates at least S1-MME, which is an interface for a control plane protocol to a mobility management entity (MME) in the core network. Thus, the MeNB acts as a mobility anchor for the UE 114 toward the core network. A group of serving cells associate with the MeNB may be referred to herein as a master cell group (MCG). The SeNB is an eNB, which is not the MeNB, that provides additional radio resources for the UE. A group of serving cells associated with SeNB may be referred to herein as a secondary cell group (SCG).

Certain embodiments disclosed herein reduce signaling overhead during a handover of the UE in dual connectivity where the SeNBs are expected to be deployed in the dedicated spectrum. Handover may occur frequently when small cells (such as the small cell 116) are deployed in a network due to the smaller coverage areas, as compared to the coverage area of the macro cell. In dual connectivity deployments, the handover of the UE 114 may occur as an inter-frequency or intra-frequency handover. The MeNB to MeNB (carrier frequency F1) handovers and the SeNB to SeNB (carrier frequency F2) handovers are intra-frequency handovers. The MeNB to SeNB handovers (carrier frequency F1 to carrier frequency F2) and the SeNB to MeNB handovers (carrier frequency F2 to carrier frequency F1) are inter-frequency handovers.

Figure 2:
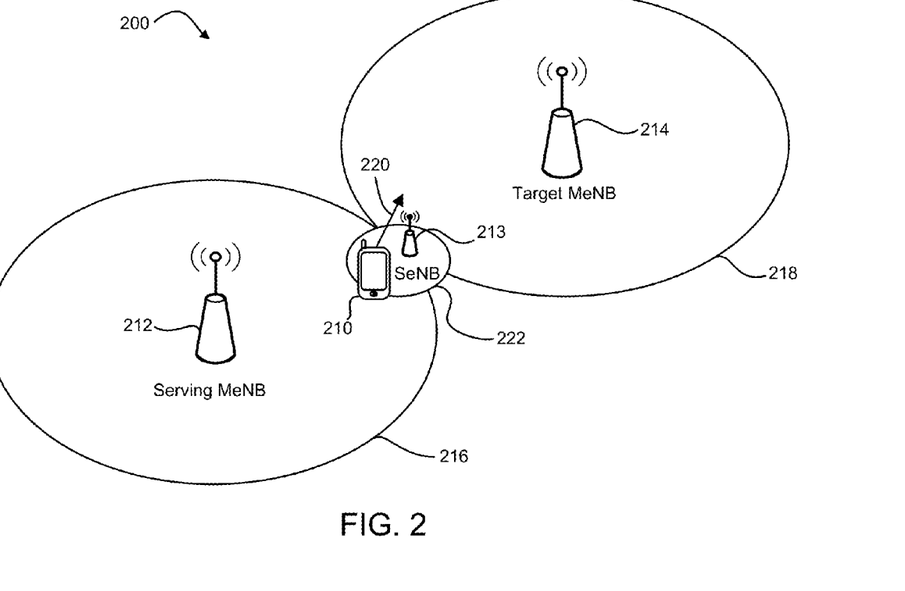
FIG. 2 is a block diagram of a communication network illustrating an example handover scenario in dual connectivity according to one embodiment.

FIG. 2 is a block diagram of a communication network 200 illustrating an example handover scenario in dual connectivity according to one embodiment. The communication network includes a UE 210 that is served by a split bearer via a serving MeNB 212 and an SeNB 213. An arrow 220 illustrated in FIG. 2 indicates a direction in which the UE 210 is traveling. In this example, the UE 210 is moving from a coverage area 216 of the serving MeNB 212 to a coverage area 218 of the target MeNB 214, while remaining in a coverage area 222 of the SeNB 213. The SeNB 213 provides an interconnection (e.g., through the X2 interface) between the serving MeNB 212 and the target MeNB 214. The UE 210 periodically measures the strength of the signals received from the serving MeNB 212. The UE 210 reports the measurements to the serving MeNB 212. As the UE 210 approaches the edge of the coverage area 216, the signal strength decreases and the serving MeNB 212 decides to handover the UE 210 to the target MeNB 214.

Generally, handover in dual connectivity may not be desirable because of the large number of overhead messages, such as radio resource control (RRC) signaling messages that are communicated during handover. In addition, handover may also include additional overhead, including physical layer reconfiguration and uplink synchronization with random access when the UE 210 enters the coverage area 218 of the target MeNB 214. Thus, significant control signaling overhead may be imposed on both the RAN (such as the MeNBs 212, 214, the SeNB 213, or other nodes) and core network infrastructure (such as an MME or serving gateway (S-GW) within an evolved packet core (EPC)). Reducing handover and/or handover signaling in heterogeneous networks using dual connectivity, according to embodiments disclosed herein, may result in significant overhead savings for the core network and/or the RAN.

In one embodiment, the serving MeNB 212 initiates a joint handover procedure to move the UE 210 and the SeNB 213 together to a new MCG associated with the target MeNB 214 so as to reduce the signaling overhead and latency. The signaling overhead is reduced, for example, by eliminating the separate processes of disconnecting and reconnecting the UE 210 to the SeNB 213. The latency is reduced, for example, by eliminating the extra delay of separate handover and SeNB change processes.

Figure 3:
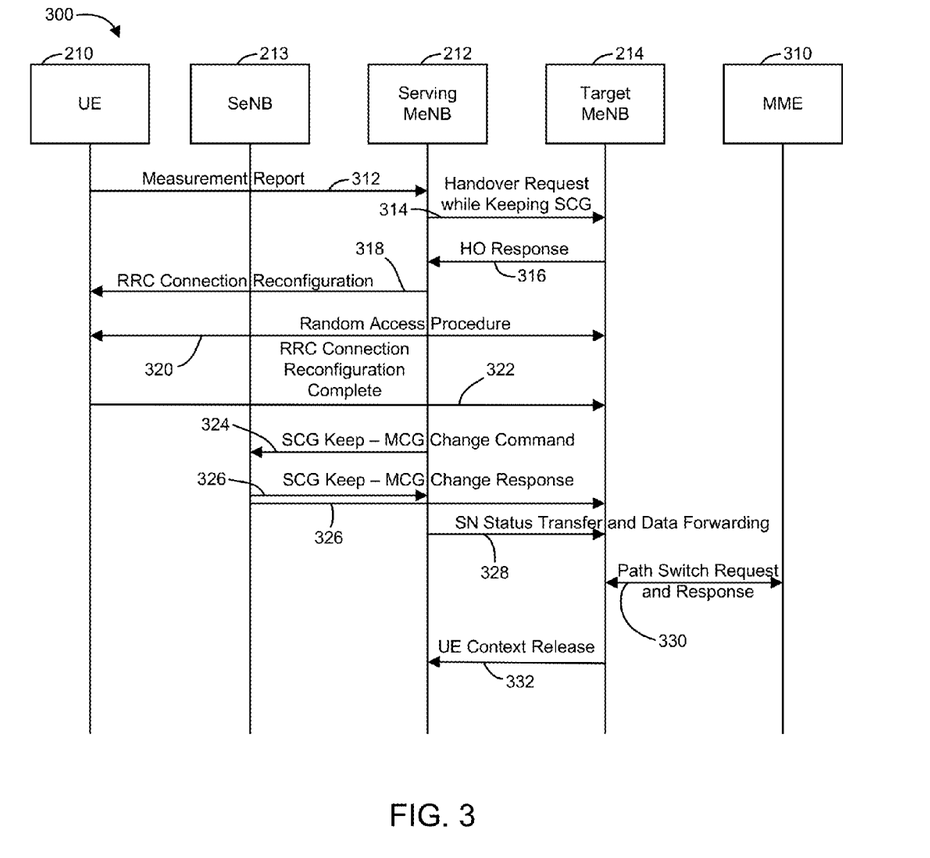
FIG. 3 is a sequence diagram illustrating a process for joint handover according to one embodiment.

FIG. 3 is a sequence diagram illustrating a process 300 for joint UE handover and SeNB change according to one embodiment. In the example shown in FIG. 3, the joint UE handover and SeNB change process 300 involves the UE 210, SeNB 213, serving MeNB 212, and target MeNB 214 shown in FIG. 2. Before the illustrated process 300 begins, the UE 210 is served by a split bearer via the serving MeNB 212 and the SeNB 213. The process 300 also includes an MME 310 in the core network. Persons skilled in the art will recognize that other core network elements may also be involved in the joint UE handover and SeNB change process 300 in certain embodiments.

The UE 210 periodically measures the reference signal received power (RSRP) or reference signal received quality (RSRQ) of the MeNB-UE link with the serving MeNB 212. The UE 210 may also periodically measure the RSRP or RSRQ of signals received from the target MeNB 214. When a measurement event is triggered, and after a time interval (e.g., set by the time to trigger (TTT) timer) selected to reduce unnecessary handovers (e.g., the "ping-pong" effect), the UE 210 sends a measurement report signal 312 to the RRC entity at the serving MeNB 212. In response, the serving MeNB 212 sends a "handover request while keeping SCG" message 314 to the target MeNB 214 via the X2 interface.

After receiving the handover request while keeping SCG message 314, the target MeNB 214 prepares for the handover of the UE 210 and the addition of the SeNB 213 to its MCG, and acknowledges acceptance of the request by sending a handover (HO) response message 316 to the serving MeNB 212 via the X2 interface. In response, the serving MeNB 212 sends a modified RRC connection reconfiguration message 318 to the UE 210. The RRC connection reconfiguration message 318 indicates an initiation of a split bearer handover of the UE 210 to the target MeNB 214 without releasing the connection between the UE 210 and the SeNB 213. Then, the UE 210 starts a random access procedure with the target MeNB 214. The random access procedure 320 establishes a connection between the UE 210 and the target MeNB 214 (e.g., allocates uplink radio resources so that the UE 210 can transmit user data to the target MeNB 214). When the connection is established, the UE 210 sends an RRC connection reconfiguration complete message 322 to the target MeNB 214.

To change the MCG of the SeNB 213, the serving MeNB sends an "SCG keep—MCG change command" message 324 to the SeNB 213 via the X2 interface to indicate that the target MeNB 214 will be the new MeNB for the UE 210. In response, the SeNB 213 sends an "SCG keep—MCG change response" message 326 to the serving MeNB 212 and the target MeNB 214 to acknowledge the change in MeNB. The serving MeNB 212 sends a sequence number (SN) status transfer and data forwarding message 328 to the target MeNB 214, and the target MeNB 214 and MME 310 exchange path switch request and response messages 330. The target MeNB 214 completes the process 300 by sending a UE context release message 332 to the serving MeNB. The target MeNB 214 becomes the new serving MeNB for the UE 210, and the SeNB 213 changes MCGs without disconnecting from the UE 210. Thus, the UE 210 is served by a split bearer via the target MeNB 214 (now the serving MeNB) and the SeNB 213.

Several of the messages shown in FIG. 3 are provided below, by way of example. Some of the examples are modifications of messages in the 3GPP protocol specification, such as 3GPP Technical Specification (TS) 36.331, V12.0.0 (2013-12) (TS 36.331); and 3GPP TS 36.423, V12.0.0 (2013-12) (TS 36.423).

In one embodiment, the RRC connection reconfiguration message 318 shown in FIG. 3 is a modification of the RRCConnectionReconfiguration message of TS 36.331 with an additional "CellToKeeplist" field, as shown in the example abstract syntax notation one (ASN.1) code below:
RRCConnectionReconfiguration message

```
-- ASN1START
RRCConnectionReconfiguration ::=      SEQUENCE {
    rrc-TransactionIdentifier         RRC-TransactionIdentifier,
    criticalExtensions                CHOICE {
        c1                                CHOICE{
            rrcConnectionReconfiguration-r8    RRCConnectionReconfiguration-r8-IEs,
                spare7 NULL,
                spare6 NULL, spare5 NULL, spare4 NULL,
                spare3 NULL, spare2 NULL, spare1 NULL
        },
        criticalExtensionsFuture          SEQUENCE { }
    }
}
RRCConnectionReconfiguration-r8-IEs ::= SEQUENCE {
    measConfig                        MeasConfig          OPTIONAL,    -- Need ON
    mobilityControlInfo               MobilityControlInfo OPTIONAL,    --Cond HO
    dedicatedInfoNASList              SEQUENCE (SIZE(1..maxDRB)) OF
                                          DedicatedInfoNAS OPTIONAL,   --Cond nonHO
    radioResourceConfigDedicated      RadioResourceConfigDedicated
                                          OPTIONAL, -- Cond HO-toEUTRA
    securityConfigHO                  SecurityConfigHO    OPTIONAL, -- Cond HO
    nonCriticalExtension              RRCConnectionReconfiguration-v890-IEs
                                          OPTIONAL     -- Need OP
}
RRCConnectionReconfiguration-v890-IEs ::= SEQUENCE {
    lateNonCriticalExtension          OCTET STRING OPTIONAL,    -- Need OP
    nonCriticalExtension              RRCConnectionReconfiguration-v920-IEs
                                          OPTIONAL     -- Need OP
}
RRCConnectionReconfiguration-v920-IEs ::= SEQUENCE {
    otherConfig-r9                    OtherConfig-r9      OPTIONAL,   -- Need ON
    fullConfig-r9                     ENUMERATED {true}
                                          OPTIONAL,   -- Cond HO-Reestab
    nonCriticalExtension              RRCConnectionReconfiguration-v1020-IEs
                                          OPTIONAL     -- Need OP
}
RRCConnectionReconfiguration-v1020-IEs ::= SEQUENCE {
    sCellToReleaseList-r10            SCellToReleaseList-r10 OPTIONAL, -- Need ON
    sCellToAddModList-r10             SCellToAddModList-r10 OPTIONAL, -- Need ON
    nonCriticalExtension              RRCConnectionReconfiguration-v1130-IEs
                                          OPTIONAL     -- Need OP
}
RRCConnectionReconfiguration-v1130-IEs ::= SEQUENCE {
    systemInfomationBlockType1Dedicated-r11   OCTET STRING (CONTAINING
                                          SystemInformationBlockType1)
    nonCriticalExtension              SEQUENCE { }          OPTIONAL      -- Need OP
}
SCellToAddModList-r10 ::=         SEQUENCE (SIZE (1..maxSCell-r10)) OF
                                          SCellToAddMod-r10
SCellToAddMod-r10 ::=             SEQUENCE {
    sCellIndex-r10                        SCellIndex-r10,
    cell Identification-r10               SEQUENCE {
        physCellId-r10                        PhysCellId,
        dl-CarrierFreq-r10                    ARFCN-ValueEUTRA
    }                                                 OPTIONAL,   -- Cond
SCellAdd
    radioResourceConfigCommonSCell-r10
    RadioResourceConfigCommonSCell-r10    OPTIONAL,   -- Cond SCellAdd
    radioResourceConfigDedicatedSCell-r10
    RadioResourceConfigDedicatedSCell-r10  OPTIONAL,  -- Cond SCellAdd2
    ...,
    [[ dl-CarrierFreq-v1090            ARFCN-ValueEUTRA-v9e0 OPTIONAL     --
Cond EARFCN-max
    ]]
}
SCellToReleaseList-r10 ::=        SEQUENCE (SIZE (1..maxSCell-r10)) OF
                                          SCellIndex-r10

SecurityConfig HO ::=             SEQUENCE {
    handoverType                      CHOICE {
        intraLTE                          SEQUENCE {
            securityAlgorithmConfig           SecurityAlgorithmConfig
    OPTIONAL,    -- Cond fullConfig
            keyChangeIndicator                BOOLEAN,
```

```
            nextHopChainingCount              NextHopChainingCount
        },
        interRAT                        SEQUENCE {
            securityAlgorithmConfig         SecurityAlgorithmConfig,
            nas-SecurityParamToEUTRA        OCTET STRING (SIZE(6))
        }
    }
}
RRCConnectionReconfiguration-r12-IEs ::= SEQUENCE {
    CellToKeeplist-r12      CellToKeeplist-r12   OPTIONAL,    -- Need ON
    nonCriticalExtension            RRCConnectionReconfiguration-r12-IEs
                                        OPTIONAL    -- Need OP
},
    ...
}
-- ASN1STOP
```

The "CellToKeeplist" field in the above sample ASN.1 code is optionally present, need ON, in case of handover in dual connectivity while keeping the cells at SCG and changing the cells at MCG only. Otherwise, the "CellToKeeplist" is not present in the RRCConnectionReconfiguration message.

In one embodiment, the RRC connection reconfiguration complete message 322 shown in FIG. 3 is a modification of the RRCConnectionReconfigurationComplete message of TS 36.331 with the additional "CellToKeeplist" field discussed above, as shown in the example ASN.1 code below:

RRCConnectionReconfiguration Message

```
-- ASN1START
RRCConnectionReconfigurationComplete ::= SEQUENCE {
    rrc-TransactionIdentifier       RRC-TransactionIdentifier,
    criticalExtensions              CHOICE {
        rrcConnectionReconfigurationComplete-r8
                                        RRCConnectionReconfigurationComplete-r8-IEs,
        criticalExtensionsFuture        SEQUENCE { }
    }
}
RRCConnectionReconfigurationComplete-r8-IEs ::= SEQUENCE {
    nonCriticalExtension        RRCConnectionReconfigurationComplete-v8a0-IEs
                                                                            OPTIONAL
}
RRCConnectionReconfigurationComplete-v8a0-IEs ::= SEQUENCE {
    lateNonCriticalExtension        OCTET STRING                OPTIONAL,
    nonCriticalExtension            RRCConnectionReconfigurationComplete-
                                        v1020-IEs OPTIONAL
}
RRCConnectionReconfigurationComplete-v1020-IEs ::= SEQUENCE {
    rlf-InfoAvailable-r10           ENUMERATED {true}           OPTIONAL,
    logMeasAvailable-r10            ENUMERATED {true}           OPTIONAL,
    nonCriticalExtension            RRCConnectionReconfigurationComplete-
                                        v1130-IEs OPTIONAL
}
RRCConnectionReconfigurationComplete-v1130-IEs ::= SEQUENCE {
    connEstFailInfoAvailable-r11    ENUMERATED {true}           OPTIONAL,
    nonCriticalExtension            SEQUENCE { }                OPTIONAL
}
RRCConnectionReconfiguration-r12-IEs ::= SEQUENCE {
    CellToKeeplist-r12          CellToKeeplist-r12      OPTIONAL,   -- Need ON
nonCriticalExtension            RRCConnectionReconfiguration-r12-IEs
        OPTIONAL    -- Need OP
},
-- ASN1STOP
```

In one embodiment, the handover request while keeping SCG message 314 shown in FIG. 3 is described by TABLE 1A and TABLE 1B below. See, section 9.0 of TS 36.432.

TABLE 1A

HANDOVER REQUEST WHILE KEEPING SCG

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |

TABLE 1A-continued

HANDOVER REQUEST WHILE KEEPING SCG

| IE/Group Name | Presence | Range | IE type and reference | Semantics description | Criticality | Assigned Criticality |
|---|---|---|---|---|---|---|
| Cause | M | | 9.2.6 | | YES | ignore |
| Target Cell ID | M | | ECGI 9.2.14 | | YES | reject |
| CellToKeeplist-r12 | O | | 9.2.13 | | | |
| GUMMEI | M | | 9.2.16 | | YES | reject |
| UE Context Information | | 1 | | | YES | reject |
| >MME UE S1AP ID | M | | INTEGER $(0 \ldots 2^{32}-1)$ | MME UE S1AP ID allocated at the MME | — | — |
| >UE Security Capabilities | M | | 9.2.29 | | — | — |
| >AS Security Information | M | | 9.2.30 | | — | — |
| >UE Aggregate Maximum Bit Rate | M | | 9.2.12 | | — | — |
| >Subscriber Profile ID for RAT/Frequency priority | O | | 9.2.25 | | — | — |
| >E-RABs To Be Setup List | | 1 | | | — | — |
| >>E-RABs To Be Setup Item | | 1 ... <maxnoofBearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |
| >>>DL Forwarding | O | | 9.2.5 | | — | — |
| >>>UL GTP Tunnel Endpoint | M | | GTP Tunnel Endpoint 9.2.1 | SGW endpoint of the S1 transport bearer. For delivery of UL PDUs. | — | — |
| >RRC Context | M | | OCTET STRING | Includes the RRC Handover Preparation Information message as defined in subclause 10.2.2 of TS 36.331 | — | — |
| >Handover Restriction List | O | | 9.2.3 | | — | — |
| >Location Reporting Information | O | | 9.2.21 | Includes the necessary parameters for location reporting | — | — |
| >Management Based MDT Allowed | O | | 9.2.59 | | YES | ignore |
| >Management Based MDT PLMN List | O | | MDT PLMN List 9.2.64 | | YES | ignore |
| UE History Information | M | | 9.2.38 | Same definition as in TS 36.413 | YES | ignore |

TABLE 1A-continued

| | | | | HANDOVER REQUEST WHILE KEEPING SCG | | | |
|---|---|---|---|---|---|---|---|
| IE/Group Name | Presence | Range | IE type and reference | Semantics description | | Criticality | Assigned Criticality |
| Trace Activation | O | | 9.2.2 | | | YES | ignore |
| SRVCC Operation Possible | O | | 9.2.33 | | | YES | ignore |
| CSG Membership Status | O | | 9.2.52 | | | YES | reject |
| Mobility Information | O | | BIT STRING (SIZE (32)) | Information related to the handover; the source eNB provides it in order to enable later analysis of the conditions that led to a wrong HO. | | YES | ignore |

TABLE 1B

| Range bound | Explanation |
|---|---|
| maxnoofBearers | Maximum no. of E-RABs. Value is 256 |
| maxnoofMDTPLMNs | PLMNs in the Management Based MDT PLMN list. Value is 16. |

In one embodiment, the SCG keep—MCG change command message 324 shown in FIG. 3 is described by TABLE 2A AND TABLE 2B below. See, section 9.0 of TS 36.432.

TABLE 2A

| | | | | SCG KEEP - MCG CHANGE COMMAND | | | |
|---|---|---|---|---|---|---|---|
| IE/Group Name | Presence | Range | IE type and reference | Semantics description | Criticality | Assigned Criticality | |
| Message Type | M | | 9.2.13 | | YES | reject | |
| CellToKeeplist-r12 | O | 1 ... <maxCellineNB> | 9.2.13 | | GLOBAL | reject | |
| >ECGI | M | | 9.2.14 | | — | — | |

TABLE 2B

| Range bound | Explanation |
|---|---|
| maxCellineNB | Maximum no. cells that can be served by an eNB. Value is 256. |

In one embodiment, the SCG keep—MCG change response message 326 shown in FIG. 3 is described by TABLE 3A AND TABLE 3B below. See, section 9.0 of TS 36.432.

TABLE 3A

SCG KEEP - MCG CHANGE RESPONSE

| IE/Group Name | Presence | Range | IE type and reference | Semantics description | Criticality | Assigned Criticality |
|---|---|---|---|---|---|---|
| Message Type | M | | 9.2.13 | | YES | reject |
| CellToKeeplist-r12 | | 1 ... <maxCellineNB> | 9.2.13 | | GLOBAL | ignore |
| >ECGI | M | | 9.2.14 | | — | — |
| Criticality Diagnostics | O | | 9.2.7 | | YES | ignore |

TABLE 3B

| Range bound | Explanation |
|---|---|
| maxCellineNB | Maximum no. cells that can be served by an eNB. Value is 256. |

In one embodiment, the message type information element (IE) in section 9.2.13 of TS 36.423 is modified to include a semantic description for "handover request while keeping SCG" corresponding to TABLE 2A and "SCG keep—MCG change" corresponding to TABLE 3A, as shown in TABLE 4 below.

TABLE 4

MESSAGE TYPE

| IE/Group Name | Presence | Range | IE type and reference | Semantics description |
|---|---|---|---|---|
| Procedure Code | M | | INTEGER (0 ... 255) | "0" = Handover Preparation<br>"1" = Handover Cancel<br>"2" = Load Indication<br>"3" = Error Indication<br>"4" = SN Status Transfer<br>"5" = UE Context Release<br>"6" = X2 Setup<br>"7" = Reset<br>"8" = eNB Configuration Update<br>"9" = Resource Status Reporting Initiation<br>"10" = Resource Status Reporting<br>"11" = Private Message<br>"12" = Mobility Settings Change<br>"13" = Radio Link Failure Indication<br>"14" = Handover Report<br>"15" = Cell Activation<br>"16 = Handover Request while keeping SCG"<br>"17 = SCG Keep - MCG change" |
| Type of Message | M | | CHOICE (Initiating Message, Successful Outcome, Unsuccessful Outcome, ...) | |

Figure 4:
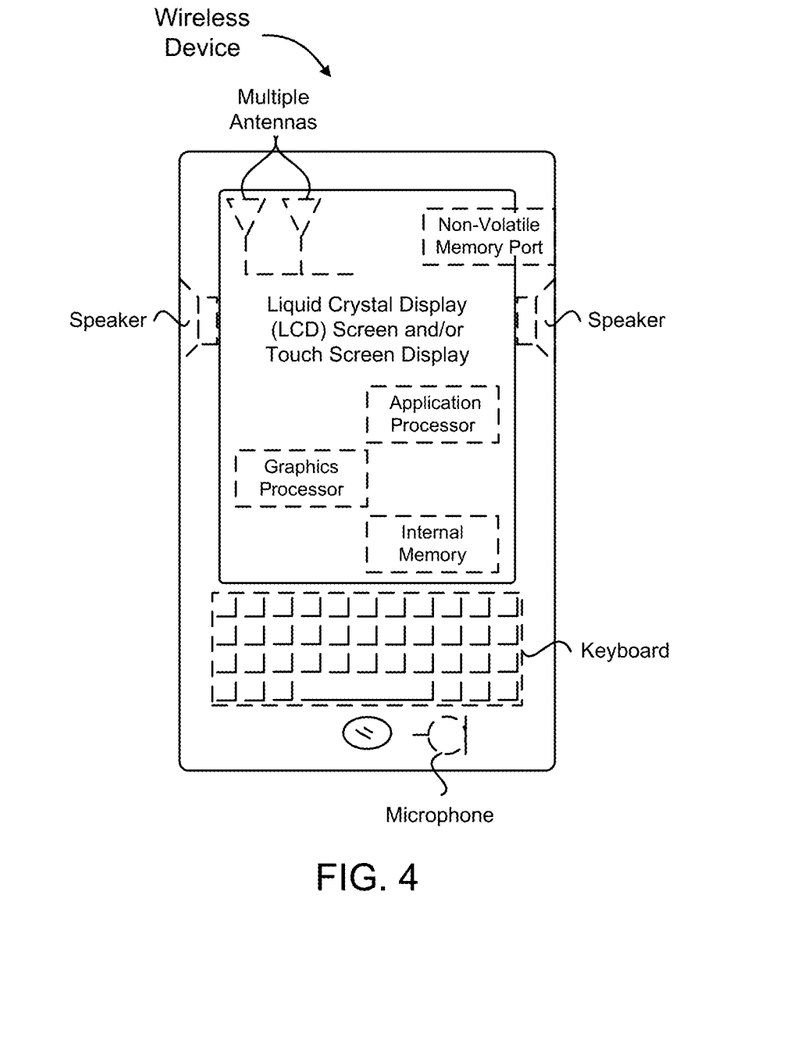
FIG. 4 is an example illustration of a mobile device according to certain embodiments.

FIG. 4 is an example illustration of a mobile device, such as a UE, a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 4 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Additional Example Embodiments

The following are examples of further embodiments.

Example 1 is an Evolved Universal Terrestrial Radio Access Network (E-UTRAN) Node B (eNB) comprising a wireless transceiver to communicate with a user equipment (UE), and a processor. The processor is configured to establish a connection as a serving master eNB (MeNB) through the wireless transceiver to the UE, the UE in dual connectivity with the serving MeNB and a secondary eNB (SeNB), determine to handover the UE from the serving MeNB to a target MeNB, and in response to the determination, handover both the UE and the SeNB to the target MeNB.

Example 2 includes the subject matter of Example 1, wherein the wireless transceiver is configured to receive a measurement report from the UE indicating at least a strength of signals received by the UE from the eNB. The processor is further configured to process the measurement report to determine that the UE is moving from a first cell coverage area corresponding to the serving MeNB to a second cell coverage area corresponding to the target MeNB. In response, the processor makes the determination to handover the UE from the serving MeNB to the target MeNB.

Example 3 includes the subject matter of any of Examples 1-2, wherein the measurement report comprises a reference signal received power (RSRP) or reference signal received quality (RSRQ).

Example 4 includes the subject matter of any of Examples 1-3, wherein to handover both the UE and the SeNB to the target MeNB, the processor is further configured to send a handover request to the target MeNB, the handover request instructing the target MeNB to keep a secondary cell group (SCG) corresponding to the SeNB, and send a radio resource control (RRC) connection reconfiguration message to the UE through the wireless transceiver, the RRC connection reconfiguration message including a field indicating a list of cells to keep in the SCG.

Example 5 includes the subject matter of Example 4, wherein the processor is further configured to send a command to the SeNB comprising the list of cells to keep in the SCG and instructions to change the SeNB to a master cell group (MCG) corresponding to the MeNB.

Example 6 includes the subject matter of Example 5, wherein the processor is further configured to: receive, from the SeNB, a response to the command; send a sequence number status transfer and data forwarding message to the target MeNB; and receive, from the target MeNB, a UE context release message.

Example 7 includes the subject matter of any of Examples 1-6, wherein the serving MeNB is configured to communicate with the SeNB and the MeNB through a non-ideal backhaul interface (X2).

Example 8. A user equipment (UE) including a plurality of wireless transceivers to receive user data through a split bearer from a first Evolved Universal Terrestrial Radio Access Network (E-UTRAN) Node B (eNB) and a second eNB. The UE also includes circuitry to: periodically measure a reference signal received power (RSRP)) or reference signal received quality (RSRQ) of a link with the first eNB; send, through a first wireless transceiver of the plurality of wireless transceivers, an RSRP or RSRQ measurement report to the first eNB; receive, from the first eNB, a message that indicates an initiation of a split bearer handover of the UE from the first eNB to a third eNB; and in response to the message, remain connected to the second eNB during the split bearer handover of the UE from the first eNB to the third eNB.

Example 9 includes the subject matter of Example 8, wherein the circuitry is further configured to determine a measurement event trigger based on the measured RSRP or RSRQ with the link with the first eNB, and wait for a predetermined time to trigger (TTT) timer to expire before sending the RSRP or RSRQ measurement report to the first eNB.

Example 10 includes the subject matter of any of Examples 8-9, wherein the message that indicates the initiation of the split bearer handover comprises a radio resource control (RRC) connection reconfiguration message including a field indicating a list of cells to keep in a secondary cell group (SCG) corresponding to the second eNB.

Example 11 includes the subject matter of any of Examples 8-10, wherein in response to receiving the RRC connection reconfiguration message, the circuitry is configured to communicate through a second wireless transceiver of the plurality of wireless transceivers with the third eNB to perform a random access procedure to establish a connection between the UE and the third eNB.

Example 12 includes the subject matter of any of Examples 8-11, wherein the UE comprises at least one of an antenna, a touch sensitive display screen, a speaker, a microphone, a graphics processor, an application processor, internal memory, a non-volatile memory port, or combinations thereof.

Example 13 is a node to communicate with a wireless communication system. The node includes one or more processors, and a computer program product comprising a computer-readable storage medium storing program code for causing the one or more processors to: associate the node with a secondary cell group (SCG) of the wireless communication system; establish a connection with a user equipment (UE); cooperate with a first node in a first master cell group (MCG) to provide dual connectivity to the UE; receive, from the first node, a command to change the dual connectivity of the UE from the first node in the first MCG to a second node in a second MCG; and in response to the command, maintain the connection with the UE and change from cooperation with the first node to cooperation with the second node to provide the dual connectivity to the UE.

Example 14 includes the subject matter of Example 13, wherein the command received from the first node in the first MCG comprises a list of cells to keep in the SCG.

Example 15 includes the subject matter of any of Examples 13-14, wherein in response to the command received from the first node in the first MCG, the node is further configured to send a message to the first node in the first MCG and the second node in the second MCG comprising a list of cells to keep in the SCG.

Example 16 includes the subject matter of any of Examples 13-15, wherein the node is configured to communicate with at least one of the first node in the first MCG and the second node in the second MCG through a non-ideal backhaul interface (X2).

Example 17 is a handover method including sending a request to handover a user equipment (UE) from a first master node to a second master node while keeping a secondary node connected to the UE, sending a message to the UE to disconnect from the first master node and to connect with the second master node while maintaining a connection with the secondary node, performing a random access procedure to establish a connection between the UE and the second master node, and terminating a connection between the UE and the first master node.

Example 18 includes the subject matter of Example 17, and further includes, after establishing the connection between UE and the second master node, sending a command to the secondary node to change from a first master cell group corresponding to the first master node to a second master cell group corresponding to the second master node while maintaining a connection between the secondary node and the UE.

Example 19 includes the subject matter of any of Examples 17-18, and further includes receiving, from the UE, a measurement report comprising a reference signal received power (RSRP) or reference signal received quality (RSRQ), and in response to the measurement report, sending the request to handover the UE from the first master node to the second master node.

Example 20 includes the subject matter of any of Examples 17-21, wherein sending the request to handover the UE from the first master node to the second master node comprises sending a list of cells to keep in a secondary cell group.

Example 21 includes the subject matter of any of Examples 17-22, wherein sending the request to handover the UE comprises sending the request through a non-ideal backhaul interface (X2).

Example 22 is a method including establishing a connection as a serving master enhanced node B (MeNB) through the wireless transceiver to a user equipment (UE). The UE is in dual connectivity with the serving MeNB and a secondary eNB (SeNB). The method further includes determining to handover the UE from the serving MeNB to a target MeNB, and in response to the determination, performing a handover of both the UE and the SeNB to the target MeNB.

Example 23 includes the subject matter of Example 22, and further includes receiving a measurement report from the UE indicating at least a strength of signals received by the UE from the eNB, processing the measurement report to determine that the UE is moving from a first cell coverage area corresponding to the serving MeNB to a second cell coverage area corresponding to the target MeNB, and in response, determining to handover the UE from the serving MeNB to the target MeNB.

Example 24 includes the subject matter of any of Examples 22-23, wherein the measurement report comprises a reference signal received power (RSRP) or reference signal received quality (RSRQ).

Example 25 includes the subject matter of any of Examples 22-24, wherein to handover both the UE and the SeNB to the target MeNB, the method further includes sending a handover request to the target MeNB, the handover request instructing the target MeNB to keep a secondary cell group (SCG) corresponding to the SeNB, and sending a radio resource control (RRC) connection reconfiguration message to the UE through the wireless transceiver, the RRC connection reconfiguration message including a field indicating a list of cells to keep in the SCG.

Example 26 includes the subject matter of Example 25, and further includes sending a command to the SeNB comprising the list of cells to keep in the SCG and instructions to change the SeNB to a master cell group (MCG) corresponding to the MeNB.

Example 27 includes the subject matter of Example 26, and further includes: receiving, from the SeNB, a response to the command; sending a sequence number status transfer and data forwarding message to the target MeNB; and receiving, from the target MeNB, a UE context release message.

Example 28 is a method comprising: receiving user data through a split bearer from a first Evolved Universal Terrestrial Radio Access Network (E-UTRAN) Node B (eNB) and a second eNB; periodically measuring a reference signal received power (RSRP)) or reference signal received quality (RSRQ) of a link with the first eNB; sending, through a first wireless transceiver, an RSRP or RSRQ measurement report to the first eNB; receiving, from the first eNB, a message that indicates an initiation of a split bearer handover of the UE from the first eNB to a third eNB; and in response to the message, remaining connected to the second eNB during the split bearer handover of the UE from the first eNB to the third eNB.

Example 29 includes the subject matter of Example 28, and further includes determining a measurement event trigger based on the measured RSRP or RSRQ with the link with the first eNB, and waiting for a predetermined time to trigger (TTT) timer to expire before sending the RSRP or RSRQ measurement report to the first eNB.

Example 30 includes the subject matter of any of Examples 28-29, wherein the message that indicates the initiation of the split bearer handover comprises a radio resource control (RRC) connection reconfiguration message including a field indicating a list of cells to keep in a secondary cell group (SCG) corresponding to the second eNB.

Example 31 includes the subject matter of Example 30, wherein in response to receiving the RRC connection reconfiguration message, the method further includes communicating through a second wireless transceiver with the third eNB to perform a random access procedure to establish a connection between the UE and the third eNB.

Example 32 is a method comprising: associating a node with a secondary cell group (SCG) of a wireless communication system; establishing a connection with a user equipment (UE); cooperating with a first node in a first master cell group (MCG) to provide dual connectivity to the UE; receiving, from the first node, a command to change the dual connectivity of the UE from the first node in the first MCG to a second node in a second MCG; and in response to the command, maintaining the connection with the UE and change from cooperation with the first node to cooperation with the second node to provide the dual connectivity to the UE.

Example 33 includes the subject matter of Example 32, wherein the command received from the first node in the first MCG comprises a list of cells to keep in the SCG.

Example 34 includes the subject matter of any of Examples 32-33, wherein in response to receiving the command from the first node in the first MCG, further includes sending a message to the first node in the first MCG and the second node in the second MCG comprising a list of cells to keep in the SCG.

Example 35 is an apparatus comprising means to perform a method as in any of Examples 17-34.

Example 36 is a machine readable storage including machine-readable instructions to implement a method as in any of Examples 17-34.

Various techniques disclosed herein, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more modules or components, which are terms used to more particularly emphasize their implementation independence. For example, a module or component may be implemented as a hardware circuit comprising custom very large scale integration (VLSI) circuits or gate arrays, off-the-shelf semiconductors such as logic chips, transistors, or other discrete components. A module or component may also be implemented in programmable hardware devices such as field programmable gate arrays, programmable array logic, programmable logic devices, or the like.

Modules or components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified module or component need not be physically located together, but may comprise disparate instructions stored in different locations that, when joined logically together, comprise the module or component and achieve the stated purpose for the module or component.

Indeed, a module or component of executable code may be a single instruction, or many instructions, and may even be distributed over several different code segments, among different programs, and across several memory devices. Similarly, operational data may be identified and illustrated herein within modules or components, and may be embodied in any suitable form and organized within any suitable type of data structure. The operational data may be collected as a single data set, or may be distributed over different locations including over different storage devices, and may exist, at least partially, merely as electronic signals on a system or network. The modules or components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

It will be understood by those having skill in the art that many changes may be made to the details of the above-described embodiments without departing from the underlying principles of the invention. The scope of the present invention should, therefore, be determined only by the following claims.

The invention claimed is:

1. An Evolved Universal Terrestrial Radio Access Network (E-UTRAN) Node B (eNB) comprising:
   a wireless transceiver to communicate with a user equipment (UE);
   a processor configured to:
      establish a connection as a serving master eNB (MeNB) through the wireless transceiver to the UE, the UE in dual connectivity with the serving MeNB and a secondary eNB (SeNB);
      determine to handover the UE from the serving MeNB to a target MeNB; and
      in response to the determination, handover both the UE and the SeNB to the target MeNB,
      wherein to handover the SeNB to the target MeNB, the processor:
         sends a handover request to the target MeNB, the handover request to instruct the target MeNB to keep a secondary cell group (SCG) corresponding to the SeNB, and
         sends a command to the SeNB comprising a list of cells to keep in the SCG and instructions to change the SeNB to a master cell group (MCG) corresponding to the target MeNB.

2. The eNB of claim 1, wherein the wireless transceiver is configured to receive a measurement report from the UE indicating at least a strength of signals received by the UE from the eNB, and wherein the processor is further configured to:
   process the measurement report to determine that the UE is moving from a first cell coverage area corresponding to the serving MeNB to a second cell coverage area corresponding to the target MeNB; and
   in response, make the determination to handover the UE from the serving MeNB to the target MeNB.

3. The eNB of claim 2, wherein the measurement report comprises a reference signal received power (RSRP) or reference signal received quality (RSRQ).

4. The eNB of claim 1, wherein to handover both the UE and the SeNB to the target MeNB, the processor is further configured to:
   send a radio resource control (RRC) connection reconfiguration message to the UE through the wireless transceiver, the RRC connection reconfiguration message including a field indicating the list of cells to keep in the SCG.

5. The eNB of claim 1, wherein the processor is further configured to:
   receive, from the SeNB, a response to the command;
   send a sequence number status transfer and data forwarding message to the target MeNB; and
   receive, from the target MeNB, a UE context release message.

6. The eNB of claim 1, wherein the serving MeNB is configured to communicate with the SeNB and the MeNB through a non-ideal backhaul interface (X2).

* * * * *